United States Patent [19]

Heitkamp

[11] 4,201,827
[45] May 6, 1980

[54] MAGNETICALLY SUPPORTED PARTICLE MATRIX FOR ACCUMULATING OR AFFECTING SUBSTANCES DISSOLVED OR FINELY DISPERSED IN A LIQUID OR GAS

[75] Inventor: Dieter Heitkamp, Jülich, Fed. Rep. of Germany

[73] Assignee: Kernforschungsanlage Jülich Gesellschaft mit beschränkter Haftung, Julich, Fed. Rep. of Germany

[21] Appl. No.: 854,095

[22] Filed: Nov. 23, 1977

[30] Foreign Application Priority Data

Nov. 25, 1976 [DE] Fed. Rep. of Germany ....... 2653551

[51] Int. Cl.² .............. B01D 35/06; B03C 1/00; B32B 5/16
[52] U.S. Cl. .................... 428/283; 428/242; 428/281; 428/329; 428/227; 428/388; 428/389; 55/3; 55/100; 210/222; 210/491; 210/496
[58] Field of Search ............ 210/222, 491, 496; 55/3, 100; 428/900, 329, 208, 389, 388, 242, 372, 281, 283

[56] References Cited

U.S. PATENT DOCUMENTS

| 3,024,392 | 3/1962 | Baermann | 210/222 X |
| 3,136,720 | 6/1964 | Baermann | 210/222 |
| 3,912,634 | 10/1975 | Howell | 210/222 |
| 4,054,513 | 10/1977 | Windle | 210/222 X |

Primary Examiner—George F. Lesmes
Assistant Examiner—Alexander S. Thomas
Attorney, Agent, or Firm—Frishauf, Hotltz, Goodman & Woodward

[57] ABSTRACT

A supporting web of synthetic fibers in which a permanently magnetic powder is embedded is used to hold fine magnetic particles in a matrix for interaction with dissolved or dispersed substances present in a liquid or gas flowing through the matrix. The magnetic force in the supporting web produced by the embedded powder lends flow resistance to the adhering particle matrix making it possible to use smaller particles effectively. Catalytic effects can be produced if the magnetic particles are coated with a nonmagnetic material having a catalytic effect for the dissolved or suspended substance, as the coating does not interfere with the tenacity of the magnetically supported matrix. A matrix with particles of a ferrimagnetic compound are useful for removal of metal ions and metal complex ions from water solution as for example uranium. Ferrimagnetic or ferromagnetic matrix particles may be provided with a coating of an ion exchange material or with some other nonmagnetic material, as for example titanium oxide to approve the adsorption of metal ions. A catalyst coating can similarly be provided for the matrix particles.

7 Claims, 2 Drawing Figures

DIRECTION OF FLOW

U.S. Patent
May 6, 1980
4,201,827
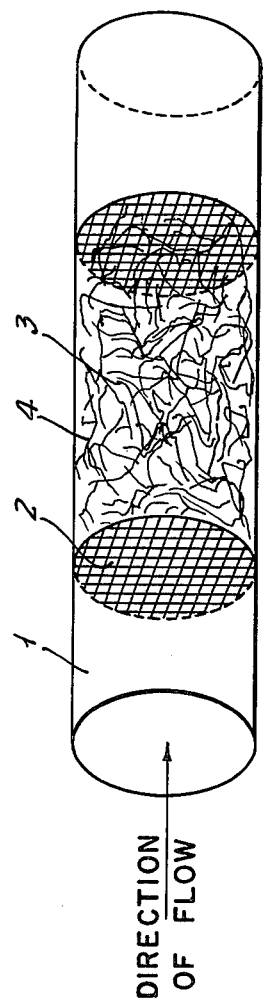
FIG. I.
DIRECTION OF FLOW
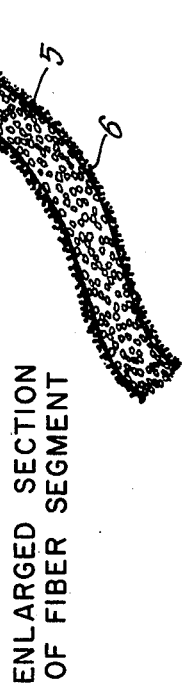
FIG. 2.
ENLARGED SECTION OF FIBER SEGMENT

MAGNETICALLY SUPPORTED PARTICLE MATRIX FOR ACCUMULATING OR AFFECTING SUBSTANCES DISSOLVED OR FINELY DISPERSED IN A LIQUID OR GAS

This invention relates to a matrix of particles provided for surface-interaction with substances dissolved or finely dispersed in a liquid or in a gas.

Such matrices are for example installed for removal of metal ions or metal complex ions from an aqueous solution, in which case the matrix particles used have a binding effect on the ions in the solution. A further application of such matrices involve their use in order to iniate or maintain a chemical reaction in which case the particles develop a catalytic effect.

Matrices for recovery of metal ions from an aqueous solution consist, for example, of agglomerations of adsorbing particles, in which the aqueous solution streams through the loose mass or deposited particles. In these cases, for obtaining the highest possible effectivity of the adsorber, it is important to make the exchange effect between the metal ion to be bound and the surface of the particles effecting the bond as intensive as possible. Since the exchange effect between the metal ions and the surface increases with the size of the surface made available, it is therefore desirable to provide the adsorbing particles in a most finally divided form in the aqueous solution. Furthermore, in the case of laminar water flow the water layer, which surrounds the adhering particles through which the diffusion of the metal ions must take place, is the thinner, the smaller the adsorber particles are. The particles should therefore be provided in as small a size as possible. On the other hand, the size of the particles has a lower limit because the layering of the particles must not oppose too great a resistance to the flow of the aqueous solution. The smaller the particles in a deposit are, the greater their resistance to water flow is. It therefore significantly results that if metals are to be reclaimed in an economic fashion from a highly diluted solution—for example in the recovery of metals from seawater—the size of the particles and also their packing density should be selected optimally for the purpose.

Also in the case of matrices that are used to catalyze a chemical reaction, the surface of the material providing the catalysis plays a decisive role. In the known matrices, therefore, metal colloids or jellylike metal precipitates are used for reactions in the liquid phase. For reactions in the gas phase micro-crystalline metal powders are used and also thin metal films that are condensed from the vapor phase on the walls of the reaction vessel. It is also known to use a metal having a catalytic effect in finally divided form on a catalytically inert carrier, as for example aluminum oxide or kieselgur, in which case a highly active surface available to the catalytic process is obtained. In these cases, however, just as in the case of adsorber particle deposits, packing density and flow resistance are not freely selectable.

THE PRESENT INVENTION

It is an object of the present invention to provide a matrix of particles provided for interaction with substances dispersed in a liquid or in a gas, in which very small particles can be used, with a packing density and a resistance to flow both of which are freely selectable independently of the size of the particles.

Briefly, the matrix of the invention comprises particles that are magnetic and are magnetically adherent to the surface of a supporting web that is at least partly composed of a permanently magnetic material.

By the provision of the particles on a supporting web in accordance with the invention the result is obtained that particles clinging to the supporting web, without the provision of an external magnetic field, can have a size down to 0.1 $\mu$m. Consequently, as a result of the small radius of curvature of the particle surfaces, relatively large magnetic field gradients hold sway even in the case of only a moderately large magnetic field generated by the supporting web, so that the attractive forces operating on the particles, which are proportional to the field gradients, are sufficiently large to hold the particles to the supporting web against the flow forces that tend to pull them apart. If the matrix is brought into an external magnetic field, it is also possible to utilize particles of sizes smaller than 0.1 $\mu$m, in which case a particularly highly active surface is obtained. Of course, it is also possible to hold particles of a greater diameter about up to a diameter 1 mm to a supporting web by magnetic forces, even without assistance of an external magnetic field.

The packing density of the particles is freely selectable in the case of a matrix according to the invention, on the one hand by the choice of the layer thickness of the particles on the surface of the supporting web and on the other hand by the constitution of the supporting web. It has been found particularly advantageous to constitute the supporting web of fibers of a chemically inert material, as for example synthetic resin or glass fibers, in which suitable magnetic materials such as are used for the production of permanent magnets, preferably in granular form, are embedded. It is important that these magnetic materials should on the one hand have a remanence that is as high as possible and on the other hand should possess a coercive force that is not too small, in order to avoid easy demagnetization. This kind of a supporting web serves a threefold purpose. The flexibility obtained by the fibrous constitution makes it quite unnecessary to compress or loosen the supporting web to which the particles are adherent in order to modify the packing density of the particles and to adjust it for the particular purpose. The supporting web can instead be enclosed in a coarse-meshed filter cage in order to expose it in that fashion to the flow of water. Furthermore the permanently magnetic fibers of the supporting web assure, by virtue of their small radius of curvature, a high magnetic field gradient directly at their surface, which also provides for a good adherence of the adsorber particles, even for an only moderate strength of the magnetic field. Finally the fibers have the advantage of not corroding even when placed in corrosive solutions.

It is desirable that particles provided for the removal of metal ions or metal complex ions from an aqueous solution should consist of a ferrimagnetic compound of iron-III of the type MeOFe$_2$O$_3$, in which the metal Me is a metal selected from the group consisting of iron, barium, nickel, cobalt and manganese. Such particles are on the one hand magnetic and on the other hand nevertheless have a sufficient binding capability for metal or metal complex ions in an aqueous solution. Adsorbtion of metal ions out of aqueous solution on ferrite particles in a limited pH range is then possible as the result of the bonding of these ions to OH groups on the oxide-water boundary. Oxide surfaces that provide a boundary with water are usually covered by OH groups that can readily produce such bonds as ligands. In this manner metals can also be adsorbed that are present in solution even in anionic form, but can be converted into a cationic form by the adsorbtion process. An advantageous further development of the invention consists in that particles provided for the removal of metal ions or metal ion complexes from an aqueous solution consist of a ferrimagnetic or feromagnetic material having a coating of a compound having a high bonding capability for the ions. In that matter, it is possible to make use of a nonmagnetic chemical compound having a high and/or also specific adsorption capability for a particular metal and still keep the particle size small. Such chemical compounds usable as a coating for the particles are for example the commercially common ion exchange agents such as Amberlite IRC-50, a weakly acid cationic exchanger for concentration of, among other materials, copper and nickel; or Amberlite IR-120 and Amberlite IRA-400, respectively a strongly acidic and a strongly basic ion exchange agent for water softening and for complete desalinization. These ion exchange agents are erosion-resistant and have good adherence. Another constitution of the matrix is advantageous, in accordance to the invention, particularly for the case of catalytically effective particles, in which the magnetic component of the supporting web consists of the same ferromagnetic metal—nickel, iron and cobalt or alloys of these metals—as do the cores of the particles clinging to the supporting web. In that case, accordingly, the effect of the chemical nature of the particle core on the catalytic effect of the coated particles is reduced—as is ascertainable in the case of the known matrices.

A further advantageous constitution of the matrix in accordance with the invention consists particularly in providing particles intended for catalytic processes which particles are constituted of a ferrimagnetic or ferromagnetic material having a coating of a nonmagnetic material that nevertheless has a catalytic effect.

The matrix of the present invention can be utilized with particular advantage for recovery of dissolved metals in brines and washes such as seawater, fresh water and also industrial waste water that may be put through the matrix. The matrix of the invention can likewise be used to advantage for water softening, water desalinization and water purification. In such cases the matrix, which can conveniently and preferably be enclosed in a coarse-mesh filter cage or network, can be exposed to the water flow until the ions to be bound are picked up in a predetermined concentration by the matrix. Thereafter the adsorbed ions are released from the adsorber matrix by suitable washing fluids according to the kinds of ions and of the adsorber, by acids, alkalies, salt solutions or complexing agents, and according to the particular application can be concentrated therefrom in a second stage by a suitable ion exchange agent. The elutriation of the matrix serves at the same time for regenerating its adsorption capability. It is thereafter made newly capable of use as an adsorber. The process steps of adsorption and washing out can thus be repeated in alternation.

BRIEF DESCRIPTION OF THE DRAWINGS

Further details of the invention are shown by way of specific examples described below and by way of the drawings, in which:

FIG. 1 is a diagrammatic perspective representation of a filter utilizing a matrix according to the invention, and FIG. 2 is a diagrammatic representation on an enlarged scale, in longitudinal section, of a portion of a fiber of the matrix of the filter of FIG. 1 with matrix particles adhering to the surface thereof.

EXAMPLE I

A supporting web was used that consisted of synthetic resin fibers, in which barium ferrite powder of the approximate composition $BaFe_{12}O_{19}$ was embedded with a volume ratio of approximately 1:1 and then was magnetized to saturation. Particles of cobalt ferrite of the composition $CoFe_2O_4$ and of an average diameter of 6 $\mu$m were held in the fibers of the supporting web just described. These particles were produced by precipitation by adding a solution mixed from $\frac{1}{2}$ molar $CoCl_2$ solution and a $\frac{1}{2}$ molar $FeCl_3$ solution to an 8-molar sodium hydroxide solution at 95°C.

The matrix so formed, the packing density of which corresponded approximately to 3% space filling by volume, was put into a flow of natural seawater with the pH value 8, which contained 3.3 $\mu$g of uranium per liter. At room temperature the uranium was accumulated at the matrix to a concentration of 10 mg per kg of cobalt ferrite, whereas, conversely, per g of cobalt ferrite matrix about 10 liters of seawater were depleted to 2.3 $\mu$g per liter. For elutriation of the matrix after the adsorption of uranium a 1-molar ammonium carbonate solution was used.

EXAMPLE II

The same supporting screen of synthetic fibers with embedded barium ferrite powder as was used in Example I was used in this example. In this case, however, particles of magnetite of the composition $Fe_3O_4$ with a coating of titanium oxide were held magnetically to the fibers of the screen. The average diameter of the particles was 20 $\mu$m.

In the preparation of these coated particles the starting material was an aqueous solution obtained by slowly adding 200 ml 20% hydrochloric acid to 20 ml $TiCl_4$ (liquid) followed by dilution with distilled water in the ratio 1:50. 40 mg of magnetite powder ($Fe_3O_4$) of an average grain diameter of 10 $\mu$m were added to 100 ml of the above described titanium solution and stirred to produce a uniform suspension, after which titanium oxide was precipitated by the addition of 100 ml of concentrated ammonium hydroxide solution with rapid stirring, the magnetite grains then serving as precipitation centers.

The matrix consisting of the supporting web with titanium oxide coated particles adhering magnetically to it was then placed in a flow of natural seawater of pH 8 containing 2 $\mu$g of vanadium and 3.3 $\mu$g of uranium per liter. The packing density of the matrix corresponded to a space filling of about 3%. After about 500 liters of the seawater had flowed once through the matrix at a throughput of 10 liters per hour and a flow velocity of about 1 cm per second, at room temperature, accumulation of 300 mg of vanadium and 250 mg of uranium per kg of titanium oxide was obtained. The seawater, on the other hand, underwent a depletion to the extent of 1.4 $\mu$g of vanadium and 2.8 $\mu$g of uranium per liter. For elutriation of the matrix after the adsorption of uranium and vanadium a 1-molar sodium carbonate solution was used.

In FIG. 1 there is shown a filter apparatus by which, for example, sea water is brought into contact with a matrix in accordance with the invention. The sea water is supplied through a tube 1 in which two coarse-mesh filters 2 (mesh width about 1 cm) are arranged one behind the other and hold the support web 3 provided in the form of a skein or snarl of fibers 4, in which—as shown in FIG. 2—magnetic particles 5 are embedded and on the exterior of which the particles 6 intended for interaction (adsorption) are held.

For manufacture of the synthetic fibers of which the supporting web consists, unpolymerized synthetic resin is mixed with barium ferrite powder in a volume proportion of about 1:1 and is brought to polymerization by the addition of a hardening liquid. During the polymerization process, in the course of which the viscosity of the synthetic resin slowly increases, at a certain degree of viscosity that is sufficiently great to prevent coalescence of the barium ferrite powder, but small enough to permit the alignment of the ferrite particles, a magnetic field is applied. The material is then drawn into thin fibers of a diameter of about 0.3 mm. These, after complete hardening, form the supporting web as an irregularly entwined loose fiber mass.

Instead of the kind of fiber web shown in FIG. 1, a woven web of magnetic-powder-bearing fibers could be used.

Although the invention has been described with reference to particular illustrative procedures, it will be understood that modifications and variations are possible within the inventive concept.

We claim:

1. A matrix of particles for surface-interaction with a substance dissolved or dispersed in a liquid or gas comprising:
    a supporting porous web of a composite material consisting of chemically inert fibrous material bearing, embedded therein, powder of a permanently magnetic material, and
    a porous mass of magnetic particles clinging to said supporting web by magnetic attraction forces.

2. A matrix as defined in claim 1 in which said supporting web consists of flexible fibers of materials selected from the group consisting of synthetic resins and glass in which grains of a permanently magnetic powder are embedded and in which, further, said embedded grains of permanently magnetic powder and said magnetic particles clinging to said supporting web are, in each case, of a material selected from the group consisting of (1) ferrimagnetic iron-III compounds of the type $MeOF_2O_3$, in which the metal Me is a metal selected from the group consisting of iron, barium, nickel, cobalt, or manganese, and (2) permanently magnetic alloys of nickel, of iron, and of cobalt.

3. A matrix as defined in claim 2 in which, for the purpose of removal of metal ions or metal complex ions from an aqueous solution, said particles consist of a ferrimagnetic iron-III compound of the type $MeOF_2O_3$, in which the metal Me is a metal selected from the group consisting of iron, barium, nickel, cobalt, and manganese.

4. A matrix as defined in claim 2, in which, for removal of metal ions or metal complex ions from an aqueous solution, said particles consist of a ferrimagnetic or ferromagnetic material provided with a coating of a material known for having ion-exchange or ion-bonding capability.

5. A matrix as defined in claim 1 in which, for the purpose of removal of metal ions or metal complex ions from an aqueous solution, said particles consist of a ferrimagnetic iron-III compound of the type $MeOFe_2O_3$, in which the metal Me is a metal selected from the group consisting of iron, barium, nickel, cobalt, and manganese.

6. A matrix as defined in claim 1, in which, for removal of metal ions or metal complex ions from an aqueous solution, said particles consist of a ferrimagnetic or ferromagnetic material provided with a coating of a material known for having ion-exchange or ion-bonding capability.

7. A matrix as defined in claim 1, in which said permanently magnetic material powder embedded in said supporting web and said particles clinging thereto consist essentially of a permanently magnetic ferromagnetic metal or metal alloy, the ferromagnetic metal or alloy in said embedded powder being the same metal or alloy in said particles that are magnetically clinging thereto.

* * * * *